US012746476B2

(12) United States Patent
Williams et al.

(10) Patent No.: US 12,746,476 B2
(45) Date of Patent: Sep. 29, 2026

(54) SYSTEMS AND METHODS FOR DISPLAYING PLAYER MATCHUPS WITH DYNAMICALLY SELECTED DIFFICULTY LEVELS

(71) Applicant: Aristocrat Technologies, Inc., Las Vegas, NV (US)

(72) Inventors: Timothy Williams, Frederick, MD (US); Adam Martinazzi, Grand Rapids, MI (US); Austin Takechi, San Jose, CA (US); Ryan Shackelford, Portage, MI (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 139 days.

(21) Appl. No.: 18/590,819

(22) Filed: Feb. 28, 2024

(65) Prior Publication Data

US 2025/0144528 A1 May 8, 2025

Related U.S. Application Data

(60) Provisional application No. 63/597,289, filed on Nov. 8, 2023.

(51) Int. Cl.
*A63F 13/67* (2014.01)

(52) U.S. Cl.
CPC .................................... *A63F 13/67* (2014.09)

(58) Field of Classification Search
None
See application file for complete search history.

(56) References Cited

U.S. PATENT DOCUMENTS 10,970,957 B1 4/2021 Decasa, Jr.
12,250,305 B2 3/2025 Meyers
12,380,416 B1 8/2025 Goldberg
2010/0144424 A1* 6/2010 Rogers .................... A63F 13/67 463/30

(Continued)

OTHER PUBLICATIONS

Office Action (Non-Final Rejection) dated Sep. 10, 2025 for U.S. Appl. No. 18/590,898 (pp. 1-17).

(Continued)

*Primary Examiner* — Jason T Yen
(74) *Attorney, Agent, or Firm* — ALG Intellectual Property, LLC

(57) ABSTRACT

A system for displaying player matchups with dynamically selected difficulty levels. In one example, the system may include and/or implement circuitry configured to identify a rating of a player involved in a first player-versus-environment (PVE) match and then select, based at least in part on the rating, a level of difficulty associated with a set of enemies involved in the first PVE match. Additionally or alternatively, the system may include and/or implement a graphics processing unit (GPU) configured to render a user interface that presents a video game that involves the first PVE match and a second PVE match in response to at least one instruction received from the circuitry. The GPU may be further configured to render, in the user interface, the set of enemies involved in the first PVE match in response to the at least one instruction. Various other devices, systems, and methods are also disclosed.

19 Claims, 7 Drawing Sheets

(56) References Cited

U.S. PATENT DOCUMENTS

| | | | | |
|---|---|---|---|---|
| 2010/0304839 | A1* | 12/2010 | Johnson | A63F 13/67 463/43 |
| 2012/0026157 | A1* | 2/2012 | Unkel | H04N 13/356 345/419 |
| 2012/0123570 | A1 | 5/2012 | Guinn | |
| 2017/0259177 | A1* | 9/2017 | Aghdaie | G06N 7/01 |
| 2019/0091577 | A1* | 3/2019 | Reiche, III | A63F 13/795 |
| 2020/0023277 | A1 | 1/2020 | Chow | |
| 2020/0078685 | A1* | 3/2020 | Aghdaie | A63F 13/79 |
| 2020/0274712 | A1 | 8/2020 | Gray | |
| 2020/0289943 | A1 | 9/2020 | Rico | |
| 2020/0298118 | A1 | 9/2020 | Yannakakis | |
| 2020/0298128 | A1 | 9/2020 | Yannakakis | |
| 2021/0146254 | A1 | 5/2021 | Snodgrass | |
| 2022/0016529 | A1 | 1/2022 | Meilich | |
| 2022/0351195 | A1 | 11/2022 | Quigley | |
| 2022/0358576 | A1 | 11/2022 | Diesch | |
| 2023/0079127 | A1 | 3/2023 | Benedetto | |
| 2023/0177492 | A1 | 6/2023 | Vaish | |
| 2023/0177921 | A1 | 6/2023 | Mikulich | |
| 2023/0214792 | A1 | 7/2023 | Lee | |
| 2023/0266930 | A1 | 8/2023 | Baker | |
| 2023/0274244 | A1 | 8/2023 | Quigley | |
| 2024/0126919 | A1 | 4/2024 | Ankrom | |
| 2024/0127376 | A1 | 4/2024 | Ratias | |
| 2024/0165509 | A1 | 5/2024 | Flores | |
| 2024/0202725 | A1 | 6/2024 | Anapliotis | |
| 2024/0273518 | A1 | 8/2024 | Eby | |
| 2024/0321057 | A1 | 9/2024 | Marsch | |
| 2025/0312699 | A1 | 10/2025 | Amadori | |

OTHER PUBLICATIONS

Office Action (Final Rejection) dated Mar. 3, 2026 for U.S. Appl. No. 18/590,898 (pp. 1-21).

Office Action (Non-Final Rejection) dated Jan. 2, 2026 for U.S. Appl. No. 18/590,824 (pp. 1-9).

Haberman, et al., "Heroes of the Storm Guide: The Haunted Mines", IGN, Apr. 2, 2014; available at https://www.ign.com/wikis/heroes-of-the-storm/The_Haunted_Mines (Year: 2014).

Office Action (Final Rejection) dated Apr. 30, 2026 for U.S. Appl. No. 18/590,824 (pp. 1-10).

Office Action (Non-Final Rejection) dated Jun. 3, 2026 for U.S. Appl. No. 18/590,898 (pp. 1-24).

* cited by examiner

SYSTEMS AND METHODS FOR DISPLAYING PLAYER MATCHUPS WITH DYNAMICALLY SELECTED DIFFICULTY LEVELS

PRIORITY CLAIM

This application claims priority to U.S. Provisional Application No. 63/597,289 filed Nov. 8, 2023, the disclosure of which is incorporated in its entirety by this reference.

RELATED APPLICATIONS

This application relates to U.S. application Ser. No. 18/590,898 filed Feb. 28, 2024, which is titled "SYSTEMS AND METHODS FOR GENERATING AND MANAGING NON-FUNGIBLE TOKENS," and U.S. application Ser. No. 18/590,824 filed Feb. 28, 2024, which is titled "SYSTEMS AND METHODS FOR DISPLAYING PLAYER MATCH-UPS WITH DYNAMICALLY SELECTED BOTS OF VARYING STRENGTH LEVELS." The contents of both of these related applications are incorporated herein in their entirety by reference.

BACKGROUND

Certain gaming systems may enable players to interact with one another over a network. For example, a gaming system may provide and/or implement a multiplayer video game involving multiple players located remotely from one another. In this example, the gaming system may include and/or represent multiple clients operated by the players matched up against one another and a server that coordinates inputs, instructions, and/or commands submitted by the players for integration into a single game environment.

In certain types of video games, the gaming systems may apply different difficulty levels to the game environment. For example, a gaming system may provide and/or implement a single-player video game in which a single player fights against a game environment controlled by a bot. In this example, the gaming system may modify the difficulty of the game environment and/or the skill of the bot based on various criteria, such as a player selection, etc.

New types of video games may introduce new considerations that implicate and/or impact difficulty selections. For example, a new type of multiplayer video game may implement player matchups in which the players' performances against their own in-game environments are evaluated relative to one another. Unfortunately, conventional techniques for selecting difficulty levels may be incompatible and/or inadequate for such a multiplayer video game. The instant disclosure, therefore, identifies and addresses a need for systems and methods for displaying player matchups with dynamically selected difficulty levels.

SUMMARY

As will be described in greater detail below, the instant disclosure generally relates to systems and methods for displaying player matchups with dynamically selected difficulty levels. In one example, a system for accomplishing such a task may include and/or implement circuitry configured to identify a rating of a player involved in a first player-versus-environment (PVE) match. In this example, the circuitry may be further configured to select, based at least in part on the rating, a level of difficulty associated with a set of enemies involved in the first PVE match. Additionally or alternatively, the system may include and/or implement a graphics processing unit (GPU) configured to render a user interface that presents one or more digital elements of a video game that involves the first PVE match and a second PVE match in response to at least one instruction received from the circuitry. The GPU may be further configured to render, in the user interface, the set of enemies involved in the first PVE match in response to the at least one instruction.

In some examples, the circuitry may be further configured to identify an additional rating of an additional player involved in the second PVE match. In such examples, the circuitry may be further configured to select, based at least in part on the rating and the additional rating, the level of difficulty associated with the set of enemies involved in the first PVE match.

In some examples, the circuitry may be further configured to apply the level of difficulty to at least one additional enemy involved in the second PVE match based at least in part on the rating and the additional rating. In one example, the circuitry may be further configured to identify a target duration of the first PVE match. In this example, the circuitry may be further configured to select the level of difficulty associated with the set of enemies based at least in part on the rating and the target duration of the first PVE match.

In some examples, the circuitry may be further configured to search a plurality of difficulty levels for an option that, if applied to the set of enemies and an additional set of enemies involved in the second PVE match, is likely to increase uniformity between a duration of the first PVE match and a duration of the second PVE match. In such examples, the circuitry may be further configured to identify, during the search, the level of difficulty as the option based at least in part on the rating and the additional rating.

In some examples, the circuitry may be further configured to facilitate synchronous playing of the first PVE match and the second PVE match such that the player and the additional player indirectly compete against each other in view of performances by the player in the first PVE match and the additional player in the second PVE match. In one example, the rating may be based at least in part on the player's performance in at least one player-versus-player (PVP) match and/or the player's performance in at least one prior PVE match.

In some examples, the circuitry may be further configured to determine, based at least in part on a setting of the video game, that a player side of the second PVE match is controlled by a bot player. In one example, the circuitry may be further configured to select, based at least in part on the rating of the player and an additional rating of the bot player, the level of difficulty associated with the set of enemies involved in the first PVE match.

In some examples, the circuitry may be further configured to select, based at least in part on the rating of the player and the additional rating of the bot player, the bot player from a group of bot players that have varying ratings or are programmed to compete with varying levels of skill. In certain examples, the circuitry may be further configured to detect an end of a round in the first PVE match. In one example, the circuitry may be further configured to increase the level of difficulty associated with the set of enemies involved in the first PVE match prior to a start of a subsequent round in the first PVE match.

In some examples, the circuitry may be further configured to apply the increased level of difficulty to at least one additional enemy involved in the second PVE match prior to the start of the subsequent round based at least in part on the rating and the additional rating. In certain examples, the circuitry may be further configured to skip the additional level of difficulty when increasing the level of difficulty prior to the subsequent round in the first PVE match, wherein skipping the additional level of difficulty is likely to increase the uniformity between durations of the first PVE match and the second PVE match.

Similarly, a corresponding computer-implemented method may include identifying, by circuitry, a rating of a player involved in a first PVE match. In one example, the corresponding computer-implemented method may also include selecting, by the circuitry, a level of difficulty associated with a set of enemies involved in the first PVE match based at least in part on the rating. In this example, the corresponding computer-implemented method may further include rendering, by a GPU, a user interface that presents one or more digital elements of a video game that involves the first PVE match and a second PVE match in response to at least one instruction received from the circuitry. Additionally or alternatively, the corresponding computer-implemented method may include rendering, in the user interface by the GPU, the set of enemies involved in the first PVE match in response to the at least one instruction.

In some examples, a non-transitory computer-readable medium that facilitates and/or implements the above-identified method may include one or more computer-executable instructions. When executed by at least one hardware processor of a computing device, the computer-executable instructions may cause the hardware processor to identify a rating of a player involved in a first PVE match and then select a level of difficulty associated with a set of enemies involved in the first PVE match based at least in part on the rating. In one example, when executed by the hardware processor of the computing device, the computer-executable instructions may direct a graphics processing unit (GPU) to render a user interface that presents one or more digital elements of a video game that involves the first PVE match and a second PVE match and then render, in the user interface, the set of enemies involved in the first PVE match.

Features from any of the above-mentioned embodiments may be used in combination with one another in accordance with the general principles described herein. These and other embodiments, features, and advantages will be more fully understood upon reading the following detailed description. While the exemplary embodiments described herein are susceptible to various modifications and alternative forms, specific embodiments will be described in detail herein. However, the exemplary embodiments described herein are not intended to be limited to the particular forms disclosed. Rather, the instant disclosure covers all modifications, equivalents, and alternatives falling within this disclosure.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
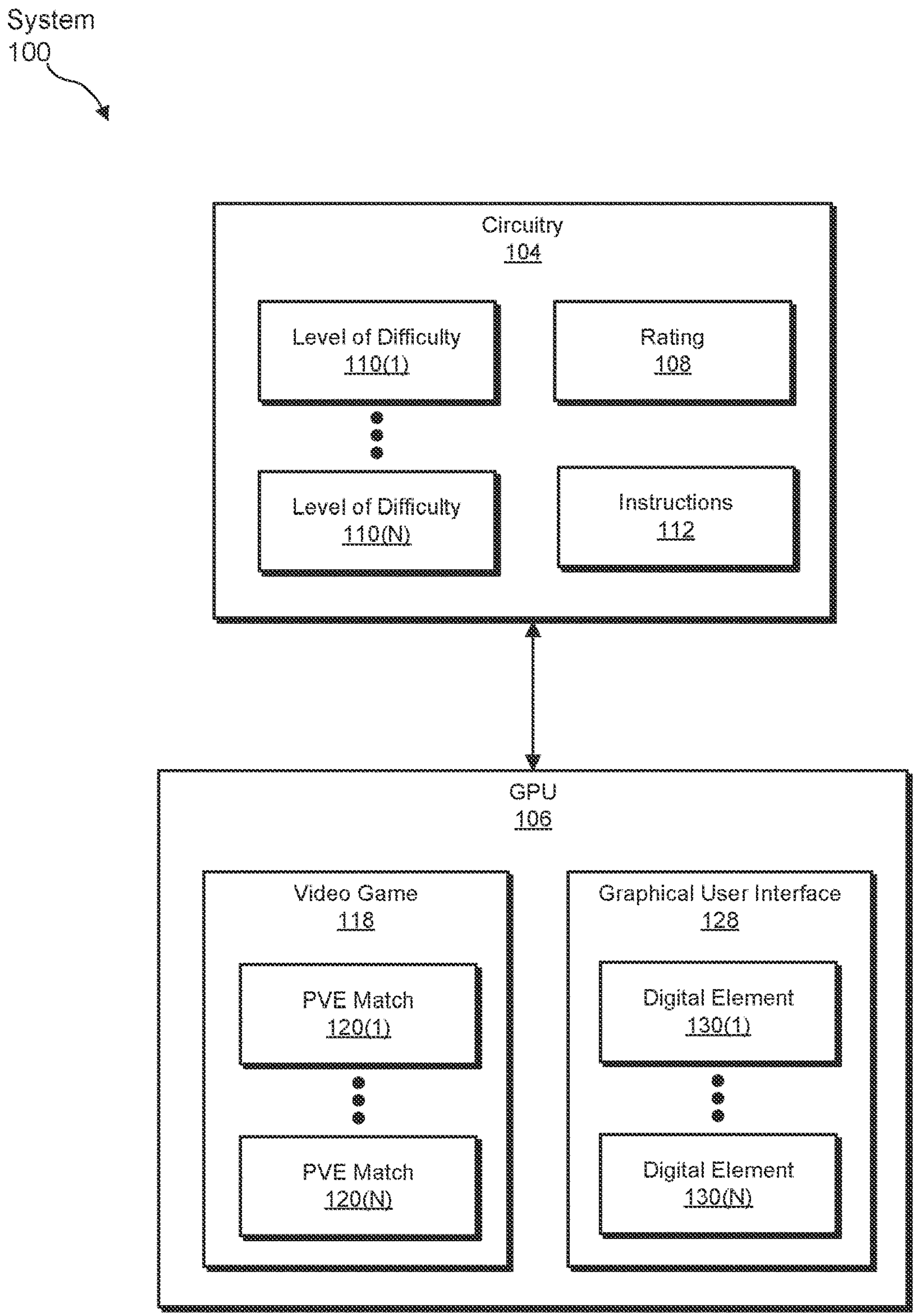
FIG. 1 is a block diagram of an exemplary system for displaying player matchups with dynamically selected difficulty levels according to one or more implementations of this disclosure.

Throughout the drawings, identical reference characters and descriptions may indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure describes various systems and methods for displaying player matchups with dynamically selected difficulty levels. As will be explained in greater detail below, embodiments of the present disclosure may improve the operation of computing systems when generating, coordinating, rendering, and/or displaying images that, in at least some cases, form part of a video game. For example, the present disclosure may align, equalize, standardize, and/or shorten the duration of one or more matches in a multiplayer matchup of a video game. These improvements may manifest as fewer central processing unit (CPU) cycles and/or GPU cycles to render the image frames, less memory being used during such rendering, and/or fewer communications transferred over hardware memory controllers and/or over hardware input/output (I/O) controllers. This process of graphics generation will be described in greater detail below.

In some examples, a networked gaming system may facilitate, support, and/or provide a multiplayer video game that involves two or more PVE matches. In one example, the networked gaming system may include and/or represent a server and multiple client devices operated by the players of the multiplayer video game. In one example, the server and/or the client devices may include and/or represent circuitry (e.g., one or more hardware processors and/or central processing units) that identifies the ratings of the players preparing to play in different PVE matches of the multiplayer video game. In this example, the circuitry may select a difficulty level associated with the enemies involved in the different PVE matches based at least in part on the ratings of the players.

In some examples, the server and/or the client devices may include and/or represent a GPU that renders a user interface that presents one or more digital elements involved in the PVE matches of the multiplayer video game in response to one or more instructions received from the circuitry. In response to the instruction(s), the GPU may render the enemies involved in the PVE matches in the user interface. In this example, the difficulty level applied to the enemies involved in the PVE matches may be strategically selected to increase the likelihood that the PVE matches last for similar or identical durations.

For example, if the ratings of the players differ from one another, one of the players may be able to complete and/or finish the corresponding PVE match, or certain rounds of the PVE match, faster than the other player unless the difficulty levels are strategically selected for their different ratings. To increase the likelihood that the PVE matches conclude at similar times instead of one being prolonged much longer than the other, the circuitry may select a difficulty level commensurate with a difference and/or delta between the player's ratings for the enemies involved in the PVE matches. In doing so, the circuitry may improve the operation, functionality, and/or performance of the networked gaming system by reducing the number of GPU cycles needed to render the image frames involved in the multi-player video game, using less memory in connection with rendering those image frames, and/or decreasing the amount of communications transferred over one or more hardware memory controllers and/or hardware I/O controllers.

The following will provide, with reference to FIGS. 1-3 and 5-7, detailed descriptions of exemplary apparatuses, devices, systems, components, and corresponding configurations or implementations for displaying player matchups with dynamically selected difficulty levels. In addition, detailed descriptions of methods for displaying player matchups with dynamically selected difficulty levels will be provided in connection with FIG. 4.

FIG. 1 illustrates an exemplary system 100 for displaying player matchups with dynamically selected difficulty levels. As illustrated in FIG. 1, system 100 may include and/or represent circuitry 104 and GPU 106. In some examples, circuitry 104 may identify a rating 108 of a player involved in a PVE match 120(1) of a video game 118. In one example, circuitry 104 may select a level of difficulty 110(1) associated with one or more enemies involved in PVE match 120(1) based at least in part on rating 108. Additionally or alternatively, circuitry 104 may send and/or transmit one or more instructions 112 to GPU 106. In certain implementations, instructions 112 may direct and/or cause GPU 106 to render a graphical user interface (GUI) 128 for and/or in connection with video game 118.

In some examples, GPU 106 may receive instructions 112 from circuitry 104. In one example, GPU 106 may generate and/or render GUI 128 that presents one or more digital elements 130(1)-(N) of video game 118 in response to instructions 112. For example, GPU 106 may generate and/or render heroes and/or titans controlled by the player to fight and/or defend against the enemies in GUI 128. In this example, GUI 128 and/or video game 118 may correspond to, represent, and/or involve PVE matches 120(1)-(N). In certain implementations, GPU 106 may also generate and/or render the enemies involved in PVE match 120(1) in GUI 128 in response to instructions 112. These enemies may perform and/or function according to level of difficulty 110(1).

In some examples, circuitry 104 may include and/or represent one or more electrical and/or electronic circuits capable of processing, applying, modifying, transforming, displaying, transmitting, receiving, and/or executing data for system 100. In one example, circuitry 104 may access and/or analyze data stored in memory to determine and/or identify rating 108 of the player. Additionally or alternatively, circuitry 104 may launch, perform, and/or execute certain executable files, code snippets, and/or computer-readable instructions to facilitate and/or support displaying player matchups with dynamically selected difficulty levels.

Although illustrated as a single unit in FIG. 1, circuitry 104 may include and/or represent a collection of multiple processing units and/or electrical or electronic components that work and/or operate in conjunction with one another. In one example, circuitry 104 may include and/or represent a CPU. In another example, circuitry 104 may include and/or represent an application-specific integrated circuit (ASIC). In certain implementations, circuitry 104 may be included and/or incorporated in a server and/or one or more client devices of system 100. Examples of circuitry 104 include, without limitation, processing devices, microprocessors, microcontrollers, graphics processing units (GPUs), field-programmable gate arrays (FPGAs), systems on chips (SoCs), parallel accelerated processors, tensor cores, integrated circuits, chiplets, optical modules, receivers, transmitters, transceivers, optical modules, storage devices, memory devices, logical circuitry, portions of one or more of the same, variations or combinations of one or more of the same, and/or any other suitable circuitry.

In some examples, GPU 106 may include and/or represent one or more hardware devices and/or electrical or electronic circuits capable of processing, generating and/or rendering graphical representations (e.g., GUIs, graphics, graphical and/or visual elements, etc.) for presentation on one or more displays, monitors, and/or graphics screens. In one example, GPU 106 may deliver and/or provide such graphical representations to the displays, monitors, and/or graphics screens in connection with video game 118. In certain implementations, GPU 106 may be included and/or incorporated in a server and/or one or more client devices of system 100.

In some examples, rating 108 may include and/or represent any type or form of data, metric, and/or number that corresponds to and/or is commensurate with the player's skill and/or past performances in video game 118 and/or other video games. In one example, rating. 108 may include and/or represent an Elo rating and/or a ranking relative to other players (e.g., matchmaking rankings), such as the player involved in PVE match 120(N). Additionally or alternatively, rating 108 may be generated and/or calculated based at least in part on the player's past performances in one or more player-versus-player (PVP) matches and/or in one or more prior PVE matches and/or matchups. Although FIG. 1 illustrates only rating 108, alternative embodiments may involve one or more additional ratings that correspond to and/or represent the skill level and/or past performances of one or more additional players.

In some examples, levels of difficulty 110(1)-(N) may implicate and/or control the strength, performance, and/or skill of the enemies involved in PVE matches 120(1)-(N). In one example, circuitry 104 may execute and/or implement a bot that controls the enemies in PVE matches 120(1)-(N) in accordance with the corresponding difficulty levels. In this example, the players operating digital elements 130(1)-(N)

in PVE matches 120(1)-(N) may attempt to fight and/or defend against those enemies whose difficulty levels have been selected dynamically based at least in part on those players' ratings.

In some examples, video game 118 may correspond to, represent, and/or provide a PVE matchup that includes and/or involves at least two different players that compete against each other in an indirect way. For example, rather than fighting against each other in video game 118, the players may fight against different sets of enemies within their respective in-game environments. In this example, video game 118 may establish playable characters and/or selectable pieces, maps, enemies, or interactive elements within those in-game environments. The in-game environments may include and/or represent the maps, enemies, and/or interactive elements with which the playable characters or selectable pieces interact (by, e.g., fighting, etc.). In some cases, the playable characters and/or selectable pieces may be strategically used to fight against the enemies and/or interactive elements, thus pitting the players against their respective in-game environments. Thus, a PVE matchup may include PVE matches 120(1)-(N), where each PVE match involves a player facing off against their own in-game environment.

In some examples, each in-game environment may include and/or represent one or more enemies that proceed along a track from an inlet and/or a source to an outlet, a goal, and/or a destination (e.g., a gate or castle). As a player faces off against the enemies within the corresponding in-game environment, the player may receive or otherwise have access to heroes, titans, and/or other digital elements with special abilities and/or functions. In one example, the player may decide how those digital elements with special abilities are placed within their environment. Additionally or alternatively, the player may further decide which abilities are used, which powerups are applied, whether to purchase additional elements, and/or how those elements are upgraded.

In some examples, these digital elements with special abilities may become overly powerful relative to a given environment and/or relative to another player who is playing against their own in-game environment. In such examples, circuitry 104 may modify or adjust the difficulty levels and/or strengths associated with the enemies or other elements involved in PVE matches 120(1)-(N) based at least in part on the ratings and/or rankings of the players in each PVE matchup. In one example, circuitry 104 may dynamically update and/or modify the level of difficulty associated with the enemies over time (e.g., after completing certain rounds) within video game 118. For example, circuitry 104 may perform such dynamic modifications each round, each matchup, and/or on a periodic (e.g., hourly, daily, weekly) basis. In certain implementations, modifying and/or selecting the level of difficulty associated with and/or applied to the enemies may include and/or involve dynamically changing one or more characteristics of the enemies. Examples of such characteristics include damage levels, armor levels, health levels, combinations or variations of one or more of the same, and/or any other suitable characteristics that implicate the difficulty level of the enemies.

In some examples, changes to the level of difficulty may apply regardless of whether the player is a human player, a bot player, or an artificial intelligence (AI) player (e.g., an AI bot). In one example, bots may be trained via a training data set to play like human players. In this example, such bots may exhibit and/or demonstrate various levels of skill and/or performance versus human players and/or enemies in different environments. Accordingly, the dynamic changes to the level of difficulty within a PVE match may apply to bot players as well as human players. Thus, bot players' rankings may rise or fall based at least in part on their performance in PVE matches.

In some examples, video game 118 may include and/or involve synchronous and/or simultaneous playing of PVE matches 120(1)-(N). In one example, circuitry 104 may facilitate and/or support synchronous and/or simultaneous playing of PVE matches 120(1)-(N) such that the players indirectly compete against each other in view of their respective performances in PVE matches 120(1)-(N). In certain implementations, circuitry 104 may determine and/or identify the winning player as the one who performs better against the corresponding enemies in PVE matches 120(1)-(N). Additionally or alternatively, circuitry 104 may implement an evaluation scheme that accounts for the players' respective performances, their ratings, and/or the difficulty levels of their respective enemies to determine and/or identify the winning player.

In some examples, circuitry 104 may identify an additional rating of the player involved in PVE match 120(N) of video game 118. In one example, circuitry 104 may apply level of difficulty 110(1) to one or more enemies involved in PVE match 120(N) based at least in part on rating 108 and the additional rating. For example, circuitry 104 may select level of difficulty 110(1) for the enemies involved in both PVE match 120(1) and PVE match 120(N). In this example, level of difficulty 110(1) may constitute and/or represent a strength and/or difficulty that corresponds to and/or is commensurate with a difference and/or delta between the ratings of the players involved in PVE match 120(1) and PVE match 120(N). In other words, level of difficulty 110(1) may constitute and/or represent a strength and/or difficulty that corresponds to and/or is commensurate with a level of skill between the ratings of the players involved in PVE match 120(1) and PVE match 120(N). For example, if the players involved in PVE matches 120(1) and 120(N) have ratings of 1300 and 1400 respectively, then level of difficulty 110(1) may constitute and/or represent a strength and/or difficulty that corresponds to and/or is commensurate with a rating of 1350.

In some examples, circuitry 104 may select a level of difficulty 110(N) associated with one or more enemies involved in PVE match 120(N) based at least in part on the additional rating. Accordingly, circuitry 104 may select one or more of levels of difficulty 110(1)-(N) based at least in part on individual ratings or a combination and/or difference of rating 108 and the additional rating. In certain implementations, GPU 106 may generate and/or render heroes and/or titans controlled by the player involved in PVE match 120(N) to fight and/or defend against the corresponding enemies. These enemies may perform and/or function according to the level(s) of difficulty applied to the enemies in PVE matches 120(1)-(N) in video game 118.

In some examples, the player's experience may be less enjoyable and/or impaired if PVE match 120(1) lasts much longer than PVE match 120(N) or vice versa. Moreover, the performance of system 100 and/or its underlying components may be impaired and/or weakened if the duration of one of PVE matches 120(1)-(N) lasts much longer than the other because the longer-lasting PVE match will extend the overall duration of the PVE matchup. In this case, the extension of the overall duration of the PVE matchup may impose a certain workload and/or bandwidth requirement on system 100. If system 100 is scaled to support several instances of PVE matchups and/or video game 118 simultaneously, the workload and/or bandwidth requirement imposed by the extension of the overall duration of one of PVE matches 120(1)-(N) may impair and/or weaken the performance of system 100 not only for PVE matches 120(1)-(N) but also for the other instances of PVE matchups and/or video game 118.

To address and/or solve these technological problems, system 100 may implement certain features and/or functions to align, equalize, standardize, and/or shorten the overall duration of the PVE matchup and/or the duration of one or more of PVE matches 120(1)-(N). For example, circuitry 104 may identify a target and/or ideal duration of the PVE matches 120(1)-(N). In one example, circuitry 104 may select level of difficulty 110(1) to be applied to the enemies involved in PVE matches 120(1)-(N) based at least in part on the target and/or ideal duration as well as the players' respective ratings. As a specific example, to achieve a duration of approximately 1 minute for both of PVE matches 120(1) and 120(N) in view of the players' respective ratings, circuitry 104 may select level of difficulty 110(1) for the enemies involved in PVE matches 120(1) and 120(N).

In another example, circuitry 104 may estimate a likely duration of one or more of PVE matches 120(1)-(N) and then select a difficulty level for the other PVE match based on certain criteria. As a specific example, circuitry 104 may estimate a likely duration of PVE match 120(1) based at least in part on the rating of the player involved in PVE match 120(1), the difficulty level associated with and/or applied to the enemies involved in PVE match 120(1), and/or the historical durations of the player's prior PVE matches. In this example, circuitry 104 may select the level of difficulty associated with and/or applied to the enemies involved in PVE match 120(N) based at least in part on the rating of the player involved in PVE match 120(N) and/or the likely duration of PVE match 120(1). Circuitry 104 may perform the selection of the difficulty level with the goal and/or objective of aligning, equalizing, and/or standardizing the durations of PVE matches 120(1)-(N). In other words, circuitry 104 may select the difficulty level(s) applied to PVE matches 120(1)-(N) with the goal and/or objective of aligning and/or equalizing the likely duration of PVE match 120(1) and the likely duration of PVE match 120(N) in view of the players' respective ratings.

In some examples, circuitry 104 may search levels of difficulty 110(1)-(N) for an option that, if applied to the enemies involved in PVE matches 120(1)-(N), is likely to increase uniformity across and/or among the durations of PVE matches 120(1)-(N). In one example, circuitry 104 may identify, during the search, level of difficulty 110(1) as the option most likely to achieve uniformity across and/or among the durations of PVE matches 120(1)-(N) based at least in part on the ratings of the players involved in PVE matches 120(1)-(N).

In some examples, PVE matches 120(1)-(N) may include and/or represent multiple rounds, stages, and/or levels of play. In one example, circuitry 104 may detect an end of a round in one of PVE matches 120(1)-(N). In this example, circuitry 104 may increase the level of difficulty associated with and/or applied to the enemies involved in one or more of PVE matches 120(1)-(N) prior to the start of a subsequent round. For example, if level of difficulty 110(1) is applied to the enemies involved in PVE matches 120(1)-(N) during the first round, then circuitry 104 may increase the difficulty of those enemies to a different level (e.g., a higher difficulty level) prior to the start of the second round. Additionally or alternatively, if level of difficulty 110(N) is applied to the enemies involved in PVE matches 120(1)-(N) during the first round, then circuitry 104 may increase the difficulty of those enemies to a different level (e.g., a higher difficulty level) prior to the start of the second round.

In some examples, circuitry 104 may apply the increased level of difficulty to the enemies involved in PVE matches 120(1)-(N) prior to the start of the subsequent round based at least in part on the players' respective ratings. In one example, levels of difficulty 110(1)-(N) may include and/or represent one or more additional levels of difficulty between the one applied during the first round and the subsequent round. Accordingly, circuitry 104 may skip and/or bypass one or more levels of difficulty when increasing the level of difficulty applied to one or more of PVE matches 120(1)-(N) prior to the subsequent round. By skipping and/or bypassing one or more level of difficulty in this way, circuitry 104 may increase the likelihood of achieving uniformity between the durations of PVE matches 120(1)-(N).

As a specific example, levels of difficulty 110(1)-(N) may include and/or represent ten different difficulty options and/or levels. In this example, circuitry 104 may select the fourth level of difficulty for application in the first round of PVE matches 120(1)-(N) based at least in part on the players' ratings. Then, after completion of the first round, circuitry 104 may select the seventh level of difficulty for application in the second round of PVE matches 120(1)-(N) based at least in part on the players' ratings. In certain implementations, this sort of staggering of the difficulty levels across PVE matches 120(1)-(N) may continue until the overall PVE matchup concludes.

Figure 2:
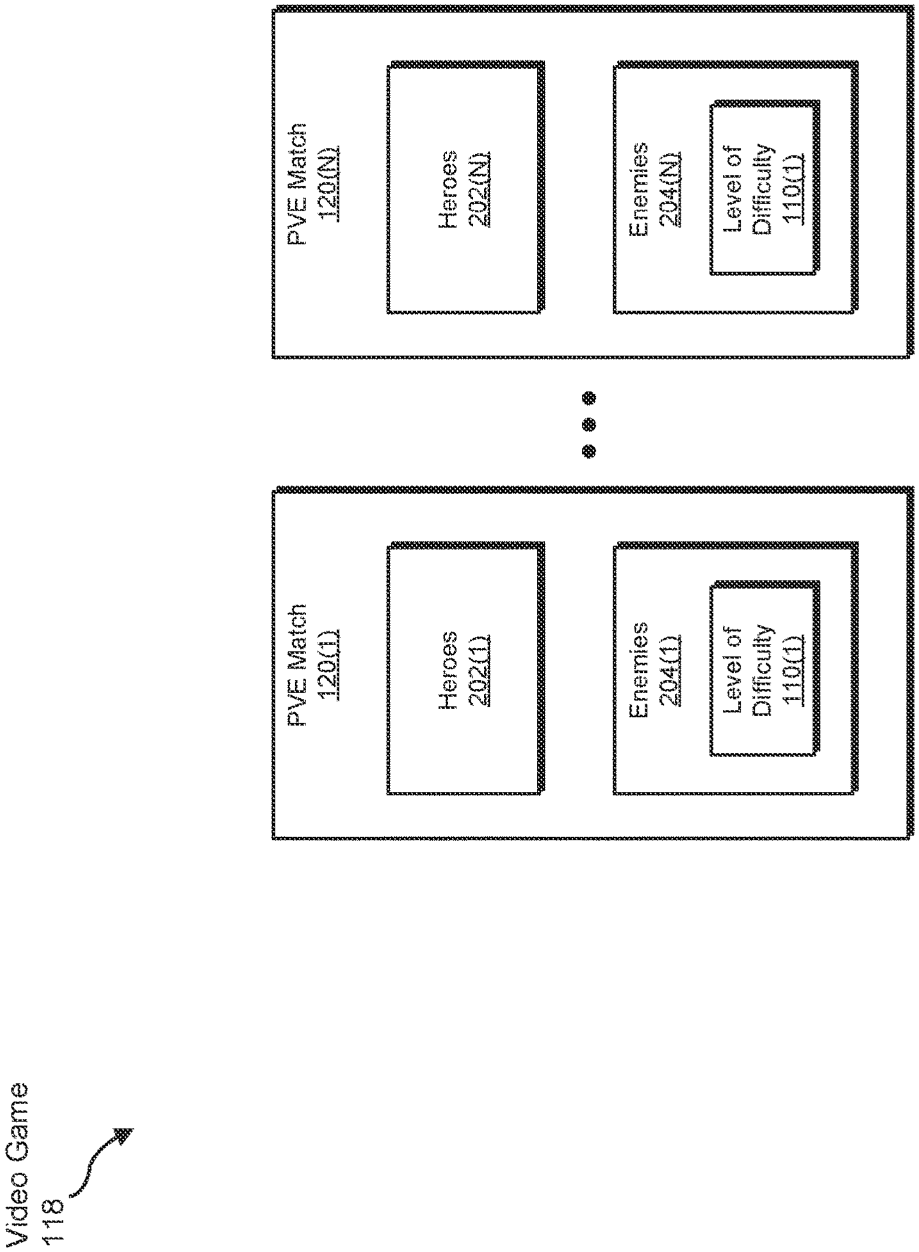
FIG. 2 is a block diagram of an exemplary video game that involves and/or implements player matchups with dynamically selected difficulty levels according to one or more embodiments of this disclosure.

FIG. 2 illustrates an exemplary implementation of video game 118, which involves player matchups with dynamically selected difficulty levels. In some examples, video game 118 may include and/or represent certain elements, components, and/or features that perform and/or provide functionalities that are similar and/or identical to those described above in connection with FIG. 1. As illustrated in FIG. 2, video game 118 may include and/or represent PVE matches 120(1)-(N). In one example, PVE match 120(1) may include, represent, and/or involve heroes 202(1) and/or enemies 204(1). Additionally or alternatively, PVE match 120(N) may include, represent, and/or involve heroes 202(N) and/or enemies 204(N).

In some examples, enemies 204(1) may be assigned level of difficulty 110(1), and enemies 204(N) may be assigned level of difficulty 110(1). In one example, enemies 204(1) may perform and/or operate according to level of difficulty 110(1), and enemies 204(N) may perform and/or operate according to level of difficulty 110(1). In this example, heroes 202(1) may constitute and/or represent the player side of PVE match 120(1) controlled by a first player, and heroes 202(N) may constitute and/or represent the player side of PVE match 120(N) controlled by a second player. Additionally or alternatively, enemies 204(1) may constitute and/or represent the bot side of PVE match 120(1) controlled by a computing device, and enemies 204(N) may constitute and/or represent the bot side of PVE match 120(N) controlled by a computing device.

In some examples, circuitry 104 may determine that heroes 202(N) are controlled by a bot implemented by a computing device, instead of being controlled by a human player. In one example, circuitry 104 may make and/or arrive at this determination based at least in part on one or more settings of video game 118. In this example, circuitry 104 may select a level of difficulty associated with and/or applied to enemies 204(N) based at least in part on the rating of the player involved in PVE match 120(1). Additionally or alternatively, circuitry 104 may select a level of skill associated with the bot controlling heroes 202(N) of PVE match 120(N) based at least in part on the rating of the player involved in PVE match 120(1).

In some examples, the bot player that controls heroes 202(N) in PVE match 120(N) may have a rating similar to the player involved in PVE match 120(1). For example, circuitry 104 may implement and/or generate a group of bot players that are available to control heroes 202(N) in PVE match 120(N) upon selection. In one example, this group of bot players may have varying ratings and/or may be programmed to compete with varying skill and/or strength levels. In this example, circuitry 104 may strategically select a certain bot player from the group based at least in part on the rating of the player involved in PVE match 120(1). As a specific example, circuitry 104 may select a bot player with a rating of 1550 to compete against a player with a rating of 1550. In doing so, circuitry 104 may increase the likelihood that PVE matches 120(1)-(N) last for similar or identical durations.

Figure 3:
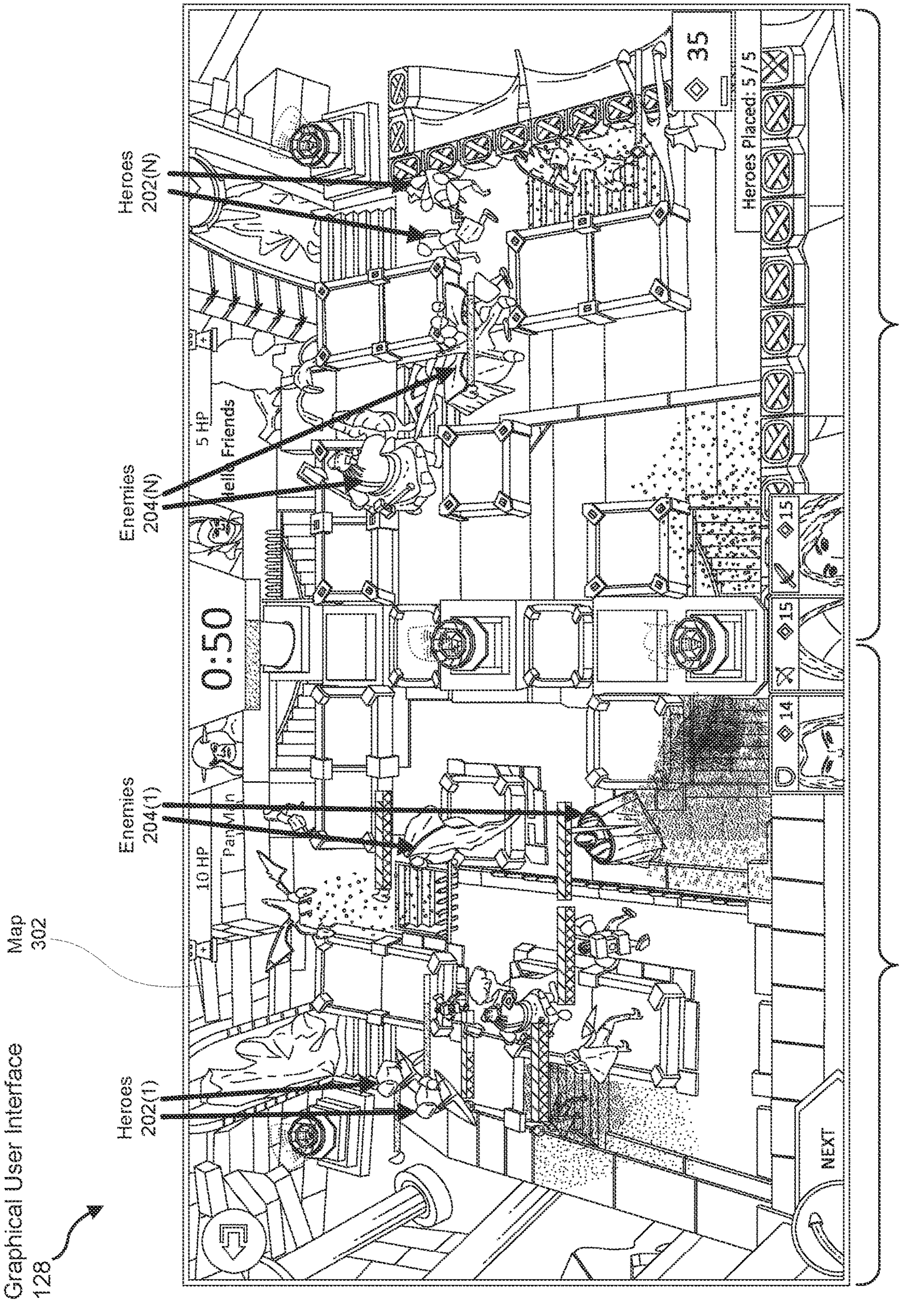
FIG. 3 is a block diagram of an exemplary user interface that presents digital elements of a video game that involves and/or implements player matchups with dynamically selected difficulty levels according to one or more embodiments of this disclosure.

FIG. 3 illustrates an exemplary implementation of GUI 128, which includes digital elements of video game 118 for presentation to the players involved in PVE matches 120 (1)-(N). In some examples, GUI 128 may include and/or represent certain elements, components, and/or features that perform and/or provide functionalities that are similar and/or identical to those described above in connection with FIG. 1 and/or FIG. 2. As illustrated in FIG. 3, GUI 128 may include and/or represent a map 302 that is bisected into two different in-game environments dedicated to and/or reserved for PVE matches 120(1)-(N). In one example, PVE match 120(1) may be shown and/or presented on the left side of map 302, and/or PVE match 120(N) may be shown and/or presented on the right side of map 302.

In some examples, heroes 202(1) and enemies 204(1) may face off and/or battle in PVE match 120(1) on the left side of map 302. In one example, heroes 202(N) and enemies 204(N) may face off and/or battle in PVE match 120(N) on the right side of map 302.

In some examples, the various systems, components, and/or features described in connection with FIGS. 1-3 may include and/or represent one or more additional circuits, components, and/or features that are not necessarily illustrated and/or labeled in FIGS. 1-3. For example, the systems, components, and/or features illustrated in FIGS. 1-3 may also include and/or represent additional analog and/or digital circuitry, onboard logic, transistors, RF transmitters, RF receivers, transceivers, antennas, resistors, capacitors, diodes, inductors, switches, registers, flipflops, digital logic, connections, traces, buses, semiconductor (e.g., silicon) devices and/or structures, processing devices, storage devices, memory devices, circuit boards, sensors, packages, substrates, housings, servers, client devices, computing devices, combinations or variations of one or more of the same, and/or any other suitable components. In certain implementations, one or more of these additional circuits, components, and/or features may be inserted and/or applied between any of the existing circuits, components, and/or features illustrated in FIGS. 1-3 consistent with the aims and/or objectives described herein. Accordingly, the couplings and/or connections described with reference to FIGS. 1-3 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide continuity from one of those two components to the other. In other words, the indirect coupling may include and/or incorporate at least one additional component between those two components.

Figure 4:
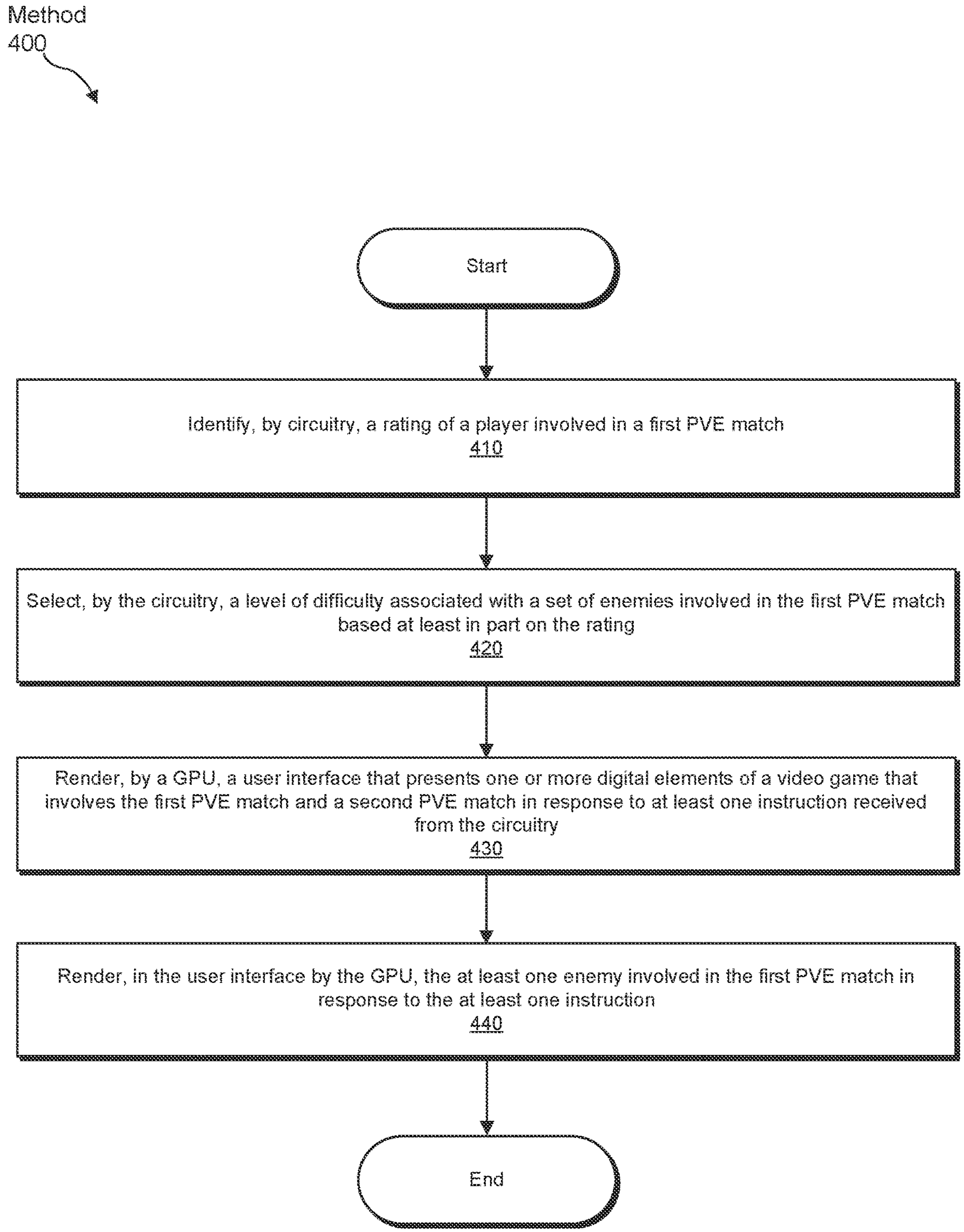
FIG. 4 is a flow diagram of an exemplary computer-implemented method for displaying player matchups with dynamically selected difficulty levels according to one or more implementations of this disclosure.

FIG. 4 is a flow diagram of an exemplary computer-implemented method 400 for displaying player matchups with dynamically selected difficulty levels. In one example, the steps shown in FIG. 4 may be achieved and/or accomplished by a networked gaming system (e.g., a server-client computing system and/or architecture). Additionally or alternatively, the steps shown in FIG. 4 may incorporate and/or involve certain sub-steps and/or variations consistent with the descriptions provided above in connection with FIGS. 1-3.

As illustrated in FIG. 4, method 400 may include the step of identifying, by circuitry, a rating of a player involved in a first PVE match (410). Step 410 may be performed in a variety of ways, including any of those described above in connection with FIGS. 1-3. For example, circuitry incorporated in a server may identify a rating of a player involved in a first PVE match.

Method 400 may also include the step of selecting, by the circuitry, a level of difficulty associated with a set of enemies involved in the first PVE match based at least in part on the rating (420). Step 420 may be performed in a variety of ways, including any of those described above in connection with FIGS. 1-3. For example, the circuitry incorporated in the server may select a level of difficulty associated with a set of enemies involved in the first PVE match based at least in part on the rating.

Method 400 may further include the step of rendering, by a GPU, a user interface that presents one or more digital elements of a video game that involves the first PVE match and a second PVE match in response to at least one instruction received from the circuitry (430). Step 430 may be performed in a variety of ways, including any of those described above in connection with FIGS. 1-3. For example, a GPU incorporated in the server and/or a client device may render a GUI that presents one or more digital elements of a video game that involves the first PVE match and a second PVE match in response to at least one instruction received from the circuitry.

Method 400 may further include the step of rendering, in the user interface by the GPU, the at least one enemy involved in the first PVE match in response to the at least one instruction (440). Step 440 may be performed in a variety of ways, including any of those described above in connection with FIGS. 1-3. For example, the GPU incorporated in the server and/or the client device may render, in the GUI, the at least one enemy involved in the first PVE match in response to the at least one instruction.

Figure 5:
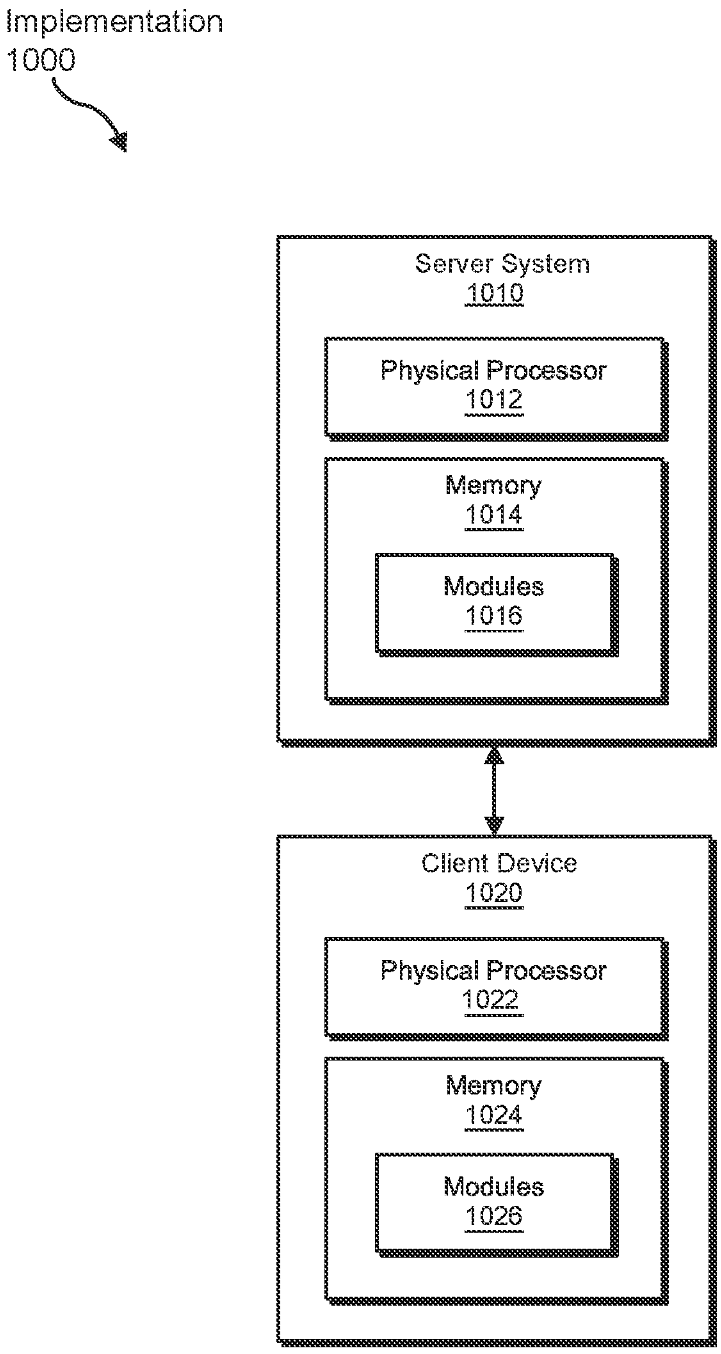
FIG. 5 is a block diagram of an exemplary implementation of a system for displaying player matchups with dynamically selected difficulty levels according to one or more embodiments of this disclosure.

In some examples, system 100 in FIG. 1 may be implemented and/or deployed in various computing configurations and/or architectures, such as server-client configuration and/or architectures. FIG. 5 illustrates an exemplary implementation 1000 of a server-client architecture that includes a server system 1010 and a client device 1020 in communication with one another (e.g., over a network). In one example, server system 1010 is configured to encode data at a specific data rate and to transfer the encoded data to client device 1020. Client device 1020 is configured to receive the encoded data via server system 1010 and to decode the data for presentation and/or playback for a player and/or user. The data provided by server system 1010 includes, for example, audio, video, text, images, animations, interactive content, haptic data, virtual or augmented reality data, location data, gaming data, or any other type of data that is provided via streaming.

Server system 1010 generally represents any services, hardware, software, or other infrastructure components configured to deliver gaming content to players. For example, server system 1010 includes content aggregation systems, media transcoding and packaging services, network components, and/or a variety of other types of hardware and software. In some cases, server system 1010 is implemented as a highly complex distribution system, a single media server or device, or anything in between. In some examples, regardless of size or complexity, server system 1010 includes at least one physical processor 1012 and at least one memory 1014. One or more modules 1016 are stored or loaded into memory 1014 to enable adaptive streaming, as discussed herein.

Client device 1020 generally represents any type or form of device or system capable of playing audio and/or video content that has been provided by server system 1010. Examples of client device 1020 include, without limitation, gaming platforms, mobile phones, tablets, laptop computers, desktop computers, televisions, set-top boxes, digital media players, virtual reality headsets, augmented reality glasses, and/or any other type or form of device capable of rendering digital content. As with server system 1010, client device 1020 includes a physical processor 1022, memory 1024, and one or more modules 1026. Some or all of the adaptive streaming processes described herein is performed or enabled by modules 1026, and in some examples, modules 1016 of server system 1010 coordinate with modules 1026 of client device 1020 to provide adaptive streaming of multimedia gaming content.

In certain embodiments, one or more of modules 1016 and/or 1026 in FIG. 5 represent one or more software applications or programs that, when executed by a computing device, cause the computing device to perform one or more tasks. For example, and as will be described in greater detail below, one or more of modules 1016 and 1026 represent modules stored and configured to run on one or more general-purpose computing devices. One or more of modules 1016 and 1026 in FIG. 5 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 1012 and 1022 generally represent any type or form of hardware-implemented processing unit capable of interpreting and/or executing computer-readable instructions. In one example, physical processors 1012 and 1022 access and/or modify one or more of modules 1016 and 1026, respectively. Additionally or alternatively, physical processors 1012 and 1022 execute one or more of modules 1016 and 1026 to facilitate adaptive streaming of multimedia gaming content. Examples of physical processors 1012 and 1022 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 1014 and 1024 generally represent any type or form of volatile or non-volatile storage device or medium capable of storing data and/or computer-readable instructions. In one example, memory 1014 and/or 1024 stores, loads, and/or maintains one or more of modules 1016 and 1026. Examples of memory 1014 and/or 1024 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 6:
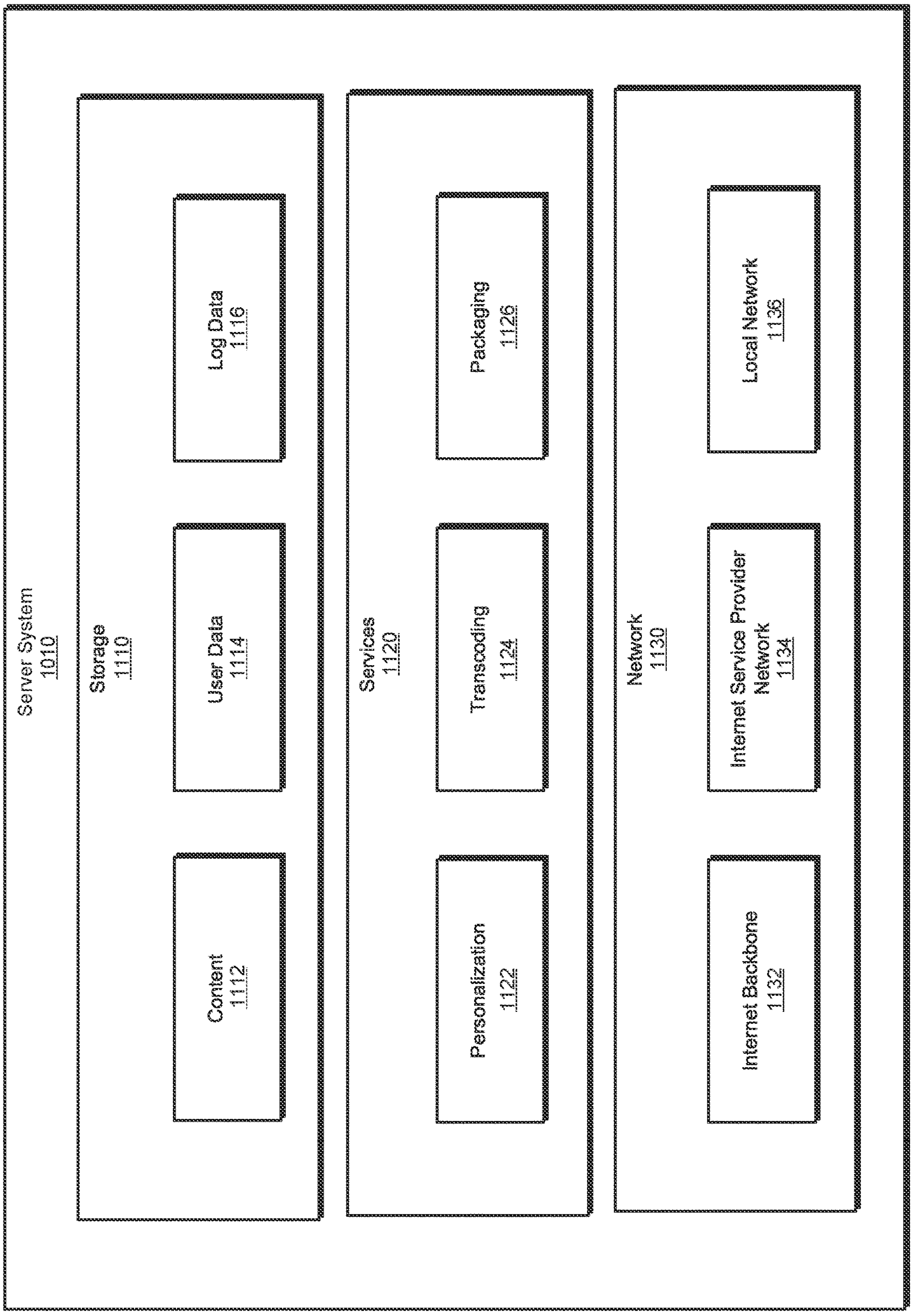
FIG. 6 is a block diagram of an exemplary implementation of server-client system that facilitates coordinating and/or distributing portions of a video game that involves and/or implements player matchups with dynamically selected difficulty levels according to one or more embodiments of this disclosure.

FIG. 6 is a block diagram of exemplary components of server system 1010 according to certain embodiments. Server system 1010 includes storage 1110, services 1120, and a network 1130. Storage 1110 generally represents any device, set of devices, and/or systems capable of storing content for delivery to end users. Storage 1110 includes a central repository with devices capable of storing terabytes or petabytes of data and/or includes distributed storage systems (e.g., appliances that mirror or cache content at Internet interconnect locations to provide faster access to the mirrored content within certain regions). Storage 1110 is also configured in any other suitable manner.

As shown, storage 1110 may store a variety of different items including content 1112, user data 1114, and/or log data 1116. Content 1112 includes video games, GUIs, user-generated content, and/or any other suitable type or form of content. User data 1114 includes personally identifiable information (PII), payment information, preference settings, language and accessibility settings, and/or any other information associated with a particular user or content player. Log data 1116 includes gaming history information, network throughput information, and/or any other metrics associated with a player's connection to or interactions with server system 1010.

Services 1120 includes personalization services 1122, transcoding services 1124, and/or packaging services 1126. Personalization services 1122 personalize recommendations, content streams, and/or other aspects of a user's experience with server system 1010. Encoding services compress media at different bitrates which, as described in greater detail below, enable real-time switching between different encodings. Packaging services 1126 package encoded video before deploying it to a delivery network, such as network 1130, for streaming.

Network 1130 generally represents any medium or architecture capable of facilitating communication or data transfer. Network 1130 facilitates communication or data transfer using wireless and/or wired connections. Examples of network 1130 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 6, network 1130 includes an Internet backbone 1132, an Internet service provider 1134, and/or a local network 1136. As discussed in greater detail below, bandwidth limitations and bottlenecks within one or more of these network segments triggers video and/or audio bit rate adjustments.

Figure 7:
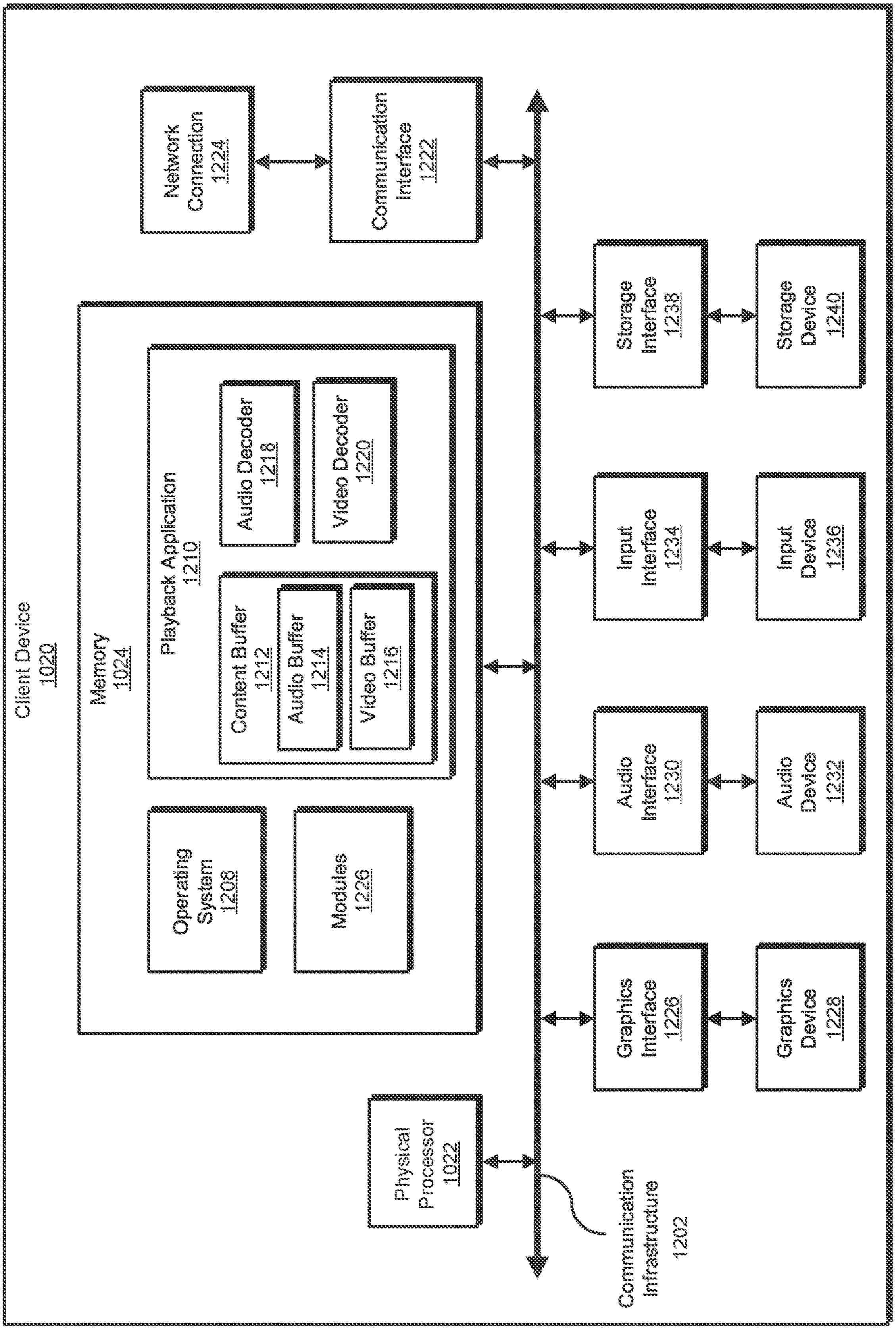
FIG. 7 is a block diagram of an exemplary client device that facilitates displaying and/or presenting a video game that involves and/or implements player matchups with dynamically selected difficulty levels according to one or more embodiments of this disclosure.

FIG. 7 is a block diagram of an exemplary implementation of client device 1020 of FIG. 5. As shown in FIG. 7, in addition to physical processor 1022 and memory 1024, client device 1020 includes a communication infrastructure 1202 and a communication interface 1222 coupled to a network connection 1224. Client device 1020 also includes a graphics interface 1226 coupled to a graphics device 1228, an input interface 1234 coupled to an input device 1236, and a storage interface 1238 coupled to a storage device 1240.

Communication infrastructure 1202 generally represents any type or form of infrastructure capable of facilitating communication between one or more components of a computing device. Examples of communication infrastructure 1202 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 1024 generally represents any type or form of volatile or non-volatile storage device or medium capable of storing data and/or other computer-readable instructions. In some examples, memory 1024 stores and/or loads an operating system 1208 for execution by physical processor 1022. In one example, operating system 1208 includes and/or represents software that manages computer hardware and software resources and/or provides common services to computer programs and/or applications on client device 1020.

Operating system 1208 performs various system management functions, such as managing hardware components (e.g., graphics interface 1226, audio interface 1230, input interface 1234, and/or storage interface 1238). Operating system 1208 also provides process and memory management models for playback application 1210. The modules of playback application 1210 includes, for example, a content buffer 1212, an audio decoder 1218, and a video decoder 1220.

Playback application 1210 is configured to retrieve digital content via communication interface 1222 and play the digital content through graphics interface 1226. Graphics interface 1226 is configured to transmit a rendered video signal to graphics device 1228. In some examples, playback application 1210 may receive a request from a user to play a specific video game. Playback application 1210 then identifies one or more encoded video and audio streams associated with the requested video game. After playback application 1210 has located the encoded streams associated with the requested title, playback application 1210 downloads sequence header indices associated with each encoded stream associated with the requested title from server system 1010. A sequence header index associated with encoded content includes information related to the encoded sequence of data included in the encoded content.

In one embodiment, playback application 1210 begins downloading the content associated with the requested title by downloading sequence data encoded to the lowest audio and/or video playback bitrates to minimize startup time for playback. The requested digital content file may then be downloaded into content buffer 1212, which is configured to serve as a first-in, first-out queue. In one embodiment, each unit of downloaded data includes a unit of video data or a unit of audio data. As units of video data associated with the requested digital content file are downloaded to the client device 1020, the units of video data are pushed into the content buffer 1212. Similarly, as units of audio data associated with the requested digital content file are downloaded to the client device 1020, the units of audio data are pushed into the content buffer 1212. In one embodiment, the units of video data are stored in video buffer 1216 within content buffer 1212 and the units of audio data are stored in audio buffer 1214 of content buffer 1212.

A video decoder 1220 reads units of video data from video buffer 1216 and outputs the units of video data in a sequence of video frames corresponding in duration to the fixed span of playback time. Reading a unit of video data from video buffer 1216 effectively de-queues the unit of video data from video buffer 1216. The sequence of video frames is then rendered by graphics interface 1226 and transmitted to graphics device 1228 to be displayed to a user.

An audio decoder 1218 reads units of audio data from audio buffer 1214 and output the units of audio data as a sequence of audio samples, generally synchronized in time with a sequence of decoded video frames. In one embodiment, the sequence of audio samples is transmitted to audio interface 1230, which converts the sequence of audio samples into an electrical audio signal. The electrical audio signal is then transmitted to a speaker of audio device 1232, which, in response, generates an acoustic output.

In situations where the bandwidth of server system 1010 is limited and/or variable, playback application 1210 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1226 is configured to generate frames of video data and transmit the frames of video data to graphics device 1228. In one embodiment, graphics interface 1226 is included as part of an integrated circuit, along with physical processor 1022. Alternatively, graphics interface 1226 is configured as a hardware accelerator that is distinct from (i.e., is not integrated within) a chipset that includes physical processor 1022.

Graphics interface 1226 generally represents any type or form of device configured to forward images for display on graphics device 1228. For example, graphics device 1228 is fabricated using liquid crystal display (LCD) technology, cathode-ray technology, and light-emitting diode (LED) display technology (either organic or inorganic). In some embodiments, graphics device 1228 also includes a virtual reality display and/or an augmented reality display. Graphics device 1228 includes any technically feasible means for generating an image for display. In other words, graphics device 1228 generally represents any type or form of device capable of visually displaying information forwarded by graphics interface 1226.

As illustrated in FIG. 7, client device 1020 also includes at least one input device 1236 coupled to communication infrastructure 1202 via input interface 1234. Input device 1236 generally represents any type or form of computing device capable of providing input, either computer or human generated, to client device 1020. Examples of input device 1236 include, without limitation, a controller, a keyboard, a pointing device, a speech recognition device, a touch screen, a joystick, a wearable device (e.g., a glove, a watch, etc.), variations or combinations of one or more of the same, and/or any other type or form of electronic input mechanism.

Client device 1020 also includes a storage device 1240 coupled to communication infrastructure 1202 via a storage interface 1238. Storage device 1240 generally represents any type or form of storage device or medium capable of storing data and/or other computer-readable instructions. For example, storage device 1240 is a magnetic disk drive, a solid-state drive, an optical disk drive, a flash drive, or the like. Storage interface 1238 generally represents any type or form of interface or device for transferring data between storage device 1240 and other components of client device 1020.

Many other devices or subsystems are included in or connected to client device 1020. Conversely, one or more of the components and devices illustrated in FIG. 7 need not be present to practice the embodiments described and/or illustrated herein. The devices and subsystems referenced above are also interconnected in different ways from that shown in FIG. 7. Client device 1020 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-executable and/or computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into client device 1020. All or a portion of the computer program stored on the computer-readable medium is then stored in memory 1024 and/or storage device 1240. When executed by physical processor 1022, a computer program loaded into memory 1024 causes physical processor 1022 to perform and/or be a means for performing the functions of one or more of the example embodiments described and/or illustrated herein. Additionally or alternatively, one or more of the example embodiments described and/or illustrated herein are implemented in firmware and/or hardware. For example, client device 1020 is configured as an Application Specific Integrated Circuit (ASIC) adapted to implement one or more of the example embodiments disclosed herein.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system comprising:
circuitry configured to:
identify a rating of a player involved in a first player-versus-environment (PVE) match; and
select, based at least in part on the rating, a level of difficulty associated with at least one enemy involved in the first PVE match; and
a graphics processing unit (GPU) configured to:
render a user interface that presents one or more digital elements of a video game that involves the first PVE match and a second PVE match in response to at least one instruction received from the circuitry;
render, in the user interface, the at least one enemy involved in the first PVE match in response to the at least one instruction; and
facilitate synchronous playing of the first PVE match and the second PVE match such that the player and an additional player involved in the second PVE match indirectly compete against each other in view of performances by the player in the first PVE match and the additional player in the second PVE match.

2. The system of claim 1, wherein the circuitry is further configured to:

identify an additional rating of the additional player involved in the second PVE match; and select, based at least in part on the rating and the additional rating, the level of difficulty associated with the at least one enemy involved in the first PVE match.

3. The system of claim 2, wherein the circuitry is further configured to apply the level of difficulty to at least one additional enemy involved in the second PVE match based at least in part on the rating and the additional rating.

4. The system of claim 1, wherein the circuitry is further configured to:

identify a target duration of the first PVE match; and select the level of difficulty associated with the at least one enemy based at least in part on the rating and the target duration of the first PVE match.

5. The system of claim 1, wherein the circuitry is further configured to:

search a plurality of difficulty levels for an option that, if applied to the at least one enemy and at least one additional enemy involved in the second PVE match, is likely to increase uniformity between a duration of the first PVE match and a duration of the second PVE match; and identify, during the search, the level of difficulty as the option based at least in part on the rating and the additional rating.

6. The system of claim 1, wherein the rating is based at least in part on:

the player's performance in at least one player-versus-player (PVP) match; or the player's performance in at least one prior PVE match.

7. The system of claim 1, wherein the circuitry is further configured to:

determine, based at least in part on a setting of the video game, that a player side of the second PVE match is controlled by a bot player; and select, based at least in part on the rating of the player and an additional rating of the bot player, the level of difficulty associated with the at least one enemy involved in the first PVE match.

8. The system of claim 7, wherein the circuitry is further configured to select, based at least in part on the rating of the player and the additional rating of the bot player, the bot player from a group of bot players that have varying ratings or are programmed to compete with varying levels of skill.

9. The system of claim 1, wherein the circuitry is further configured to:

detect an end of a round in the first PVE match; and increase the level of difficulty associated with the at least one enemy involved in the first PVE match prior to a start of a subsequent round in the first PVE match.

10. The system of claim 9, wherein the circuitry is further configured to apply the increased level of difficulty to at least one additional enemy involved in the second PVE match prior to the start of the subsequent round based at least in part on the rating and the additional rating.

11. The system of claim 10, wherein the circuitry is further configured to skip one or more levels of difficulty when increasing the level of difficulty prior to the subsequent round, wherein skipping the one or more levels of difficulty is likely to increase uniformity between durations of the first PVE match and the second PVE match.

12. A computer-implemented method comprising:

identifying, by circuitry, a rating of a player involved in a first player-versus-environment (PVE) match;

selecting, by the circuitry, a level of difficulty associated with at least one enemy involved in the first PVE match based at least in part on the rating;

rendering, by a graphics processing unit (GPU), a user interface that presents one or more digital elements of a video game that involves the first PVE match and a second PVE match in response to at least one instruction received from the circuitry;

rendering, in the user interface by the GPU, the at least one enemy involved in the first PVE match in response to the at least one instruction; and facilitating synchronous playing of the first PVE match and the second PVE match such that the player and an additional player involved in the second PVE match indirectly compete against each other in view of performances by the player in the first PVE match and the additional player in the second PVE match.

13. The computer-implemented method of claim 12, further comprising:

identifying, by the circuitry, an additional rating of the additional player involved in the second PVE match; and select, by the circuitry, an additional level of difficulty associated with at least one additional enemy involved in the second PVE match based at least in part on the rating and the additional rating.

14. The computer-implemented method of claim 13, further comprising applying the level of difficulty to at least one additional enemy involved in the second PVE match based at least in part on the rating and the additional rating.

15. The computer-implemented method of claim 12, further comprising identify a target duration of the first PVE match; and wherein selecting the level of difficulty associated with the at least one enemy comprises selecting the level of difficulty associated with the at least one enemy based at least in part on the rating and the target duration of the first PVE match.

16. The computer-implemented method of claim 15, further comprising:

searching, by the circuitry, a plurality of difficulty levels for an option that, if applied to the at least one enemy and at least one additional enemy involved in the second PVE match, is likely to increase uniformity between a duration of the first PVE match and a duration of the second PVE match; and identifying, by the circuitry, the level of difficulty as the option during the search based at least in part on the rating and the additional rating.

17. The computer-implemented method of claim 13, further comprising facilitating synchronous playing of the first PVE match and the second PVE match such that the player and the additional player indirectly compete against each other in view of performances by the player in the first PVE match and the additional player in the second PVE match.

18. The computer-implemented method of claim 12, wherein the rating is based at least in part on:

the player's performance in at least one player-versus-player (PVP) match; or the player's performance in at least one prior PVE match.

19. A non-transitory computer-readable medium comprising one or more computer-executable instructions that, when executed by at least one hardware processor of a computing device, cause the hardware processor to:

identify a rating of a player involved in a first player-versus-environment (PVE) match;

select a level of difficulty associated with at least one enemy involved in the first PVE match based at least in part on the rating; and direct a graphics processing unit (GPU) to:

render a user interface that presents one or more digital elements of a video game that involves the first PVE match and a second PVE match;

render, in the user interface, the at least one enemy involved in the first PVE match; and facilitate synchronous playing of the first PVE match and the second PVE match such that the player and an additional player involved in the second PVE match indirectly compete against each other in view of performances by the player in the first PVE match and the additional player in the second PVE match.

* * * * *